(12) United States Patent
Kharlamov

(10) Patent No.: US 11,423,021 B2
(45) Date of Patent: Aug. 23, 2022

(54) COMPUTER-IMPLEMENTED METHOD FOR KEYWORD SEARCH IN A KNOWLEDGE GRAPH

(71) Applicant: Robert Bosch GmbH, Stuttgart (DE)

(72) Inventor: Evgeny Kharlamov, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/349,059

(22) Filed: Jun. 16, 2021

(65) Prior Publication Data

US 2021/0397617 A1    Dec. 23, 2021

(30) Foreign Application Priority Data

Jun. 19, 2020  (EP) .................................... 20181044

(51) Int. Cl.
*G06F 16/2453*    (2019.01)
*G06F 16/901*    (2019.01)

(52) U.S. Cl.
CPC .... *G06F 16/24542* (2019.01); *G06F 16/9024* (2019.01)

(58) Field of Classification Search
None
See application file for complete search history.

(56) References Cited

U.S. PATENT DOCUMENTS

| | | | | |
|---|---|---|---|---|
| 8,620,909 | B1* | 12/2013 | Rennison | G06N 20/00 707/723 |
| 2015/0227589 | A1* | 8/2015 | Chakrabarti | G06F 16/24564 707/748 |
| 2020/0074999 | A1* | 3/2020 | Elliott | G06F 16/9024 |
| 2021/0064620 | A1* | 3/2021 | Namaki | G06F 16/90328 |

FOREIGN PATENT DOCUMENTS

WO    2019233463 A1    12/2019

OTHER PUBLICATIONS

Li, Shuxin, Gong Cheng, and Chengkai Li. "Relaxing relationship queries on graph data." Journal of Web Semantics 61 (2020): 100557. (Year: 2020).*

(Continued)

*Primary Examiner* — Tony Mahmoudi
*Assistant Examiner* — Umar Mian
(74) *Attorney, Agent, or Firm* — Norton Rose Fulbright US LLP; Gerard Messina

(57) ABSTRACT

A computer-implemented method for keyword search in a data set. Data of the data set is represented by a knowledge graph. The knowledge graph comprises vertices representing entities of the data set and edges representing relations between said entities. The method comprises the following steps: receiving a search query comprising at least two entities; computing for the at least two entities of the search query a salient subset of the data set, wherein the salient subset is computed such that a structural compact subgraph exists in the knowledge graph, the structural compact subgraph connecting the at least two entities of the search query, and computing for the salient subset a structural compact subgraph of the knowledge graph which connects the at least two entities of the search query.

10 Claims, 2 Drawing Sheets

(56) References Cited

OTHER PUBLICATIONS

Kasneci et al., "Star: Steiner-Tree Approximation in Relationship Graphs," ICDE, 2009, pp. 1-12. <http://resources.mpi-inf.mpg.de/yago-naga/naga/download/ICDEResearchLong09_264.pdf> Downloaded Jun. 4, 2021.
Ni et al., "Semantic Documents Relatedness Using Concept Graph Representation," in WSDM, 2016, pp. 635-644. <http://184pc128.csie.ntnu.edu.tw/presentation/16-07-12/Semantic%20Documents%20Relatedness%20using%20Concept%20Graph%20Representation.pdf> Downloaded Jun. 4, 2021.
Li et al., "Relaxing Relationship Queries On Graph Data," Cornell University, 2020 pp. 1-16.
Cheng et al., "An Empirical Evaluation of Techniques for Ranking Semantic Associations," IEEE Transactions on Knowledge and Data Engineering, vol. 29, No. 11, 2017, pp. 2388-2401.
Cheng et al., "Fast Algorithms for Semantic Association Search and Pattern Mining," IEEE Transactions on Knowledge and Data Engineering, 2019, pp. 1-13.

\* cited by examiner

COMPUTER-IMPLEMENTED METHOD FOR KEYWORD SEARCH IN A KNOWLEDGE GRAPH

CROSS REFERENCE

The present application claims the benefit under 35 U.S.C. § 119 of European Patent Application No. EP 20181044.7 filed on Jun. 19, 2020, which is expressly incorporated herein by reference in its entirety.

FIELD

The present invention relates to a computer-implemented method for keyword search in a data set, wherein data of the data set is represented by a knowledge graph.

Further, the present invention concerns a system for keyword search in a data set and a computer program for keyword search in a data set.

BACKGROUND INFORMATION

A knowledge graph, KG, is a graph where vertices are entities interconnected with binary relations and annotated with types and data values. Increasingly many knowledge graphs have been developed for various domains. Knowledge graphs support a wide range of tasks from enterprise data integration to intelligent search.

An important task for knowledge graph based applications is to extract subgraphs that are relevant to given sets of vertices, also referred to as relationship subgraphs, RSGs. For example, a set of vertices in a knowledge graph can be selected during keyword search, where a user queries the knowledge graph by posing a set of keywords and the system matches them to entities of the knowledge graph, finds relationship subgraphs of the knowledge graph that relate these entities, and returns them as answers.

The exact way how a relationship subgraph should span a given set of vertices of a knowledge graph depends on the application. A common approach is to rely on group Steiner trees. This is for example described by Gjergji Kasneci, Maya Ramanath, Mauro Sozio, Fabian M. Suchanek, and Gerhard Weikum, "STAR: steiner-tree approximation in relationship graphs," ICDE, pages 868-879, 2009.

The Group Steiner tree approach relies on trees of minimum weight that span these vertices. Computing Steiner trees is computationally demanding; indeed, deciding whether a tree has the minimum weight is NP-hard and has constant inapproximability.

Moreover, existing approximation algorithms that have provable quality guarantees also have prohibitively high run time for large knowledge graphs. A provable quality guarantee means that one can guarantee that the answers the algorithm computes is within the distance with a predefined factor from the real answers. The time for finding an optimal or suboptimal Steiner tree on a large sized knowledge graph ranges from tens to thousands of seconds for one to five input entities as a search query, and rises sharply when the input size increases. This is a problem in online processing tasks.

Efficiency of computation can be significantly improved by considering relationship subgraphs with a predefined structural compactness guarantee, for example, that are order-bounded or diameter-bounded. This is for example described in Gong Cheng, Fei Shao, and Yuzhong Qu, "An empirical evaluation of techniques for ranking semantic associations," IEEE Trans. Knowl. Data Eng., 29(11):2388-2401, 2017; and Gong Cheng, Daxin Liu, and Yuzhong Qu; "Fast algorithms for semantic association search and pattern mining," IEEE Trans. Knowl. Data Eng., Early Access:1-13, 2019.

Moreover, it is expected that human users strongly prefer structurally compact RSGs, while a small-weight relationship subgraph without any structural compactness guarantee, for example, a Steiner tree, can still be too large for user's perception.

Despite computational efficiency and effectiveness of user perception, the applicability of structurally compact RSGs is limited by the challenge, that the known methods will return empty results if the input entities are distantly distributed in the knowledge graph so that any relationship subgraph connecting them will violate the predefined structural compactness guarantee.

SUMMARY

In accordance with example embodiments of the present invention, a method and a system are provided with which empty structurally compact subgraphs can be avoided.

An example embodiment of the present invention provides a computer-implemented method for keyword search in a data set, wherein data of the data set is represented by a knowledge graph, wherein the knowledge graph comprises vertices representing entities of the data set and edges representing relations between said entities, the method comprising the steps of:
receiving a search query comprising at least two entities;
computing for the at least two entities of the search query a salient subset of the data set, wherein the salient subset is computed such that a structural compact subgraph exists in the knowledge graph, the structural compact subgraph connecting the at least two entities of the search query, and computing for the salient subset a structural compact subgraph of the knowledge graph which connects the at least two entities of the search query.

The step of computing the structural compact subgraph for the salient subset can be performed as described in Gong Cheng, Daxin Liu, and Yuzhong Qu, "Fast algorithms for semantic association search and pattern mining," IEEE Trans. Knowl. Data Eng., Early Access:1-13, 2019. The compactness of a subgraph can be measured by its diameter. For a set of input entities the disclosure presents an algorithm which efficiently searches a knowledge graph and finds subgraphs that connect all the input entities and do not exceed a predefined diameter bound. In brief, the algorithm performs pruned searches starting from each input entity and merges paths having a common end vertex into a subgraph.

Structural compactness can be guaranteed for example by order bounds. According to a preferred embodiment a structural compactness guarantee of a structural compact sub graph is based on a diameter bound. Preferably, the diameter bound can be determined prior to executing the step of computing the salient subset and the structural compact subgraph.

According to a preferred embodiment of the method, the step of computing the salient subset comprises identifying at least one subset for which a structural compact subgraph exists in the knowledge graph, wherein the salient subset is computed by solving the optimization problem given by $$Q_{max} = \underset{Q' \subseteq Q \text{ such that } repr(Q')=yes}{\arg\max} \text{score}(Q'),$$

-continued wherein $$\text{score}(Q') = \sum_{v \in Q} \text{sal}(v).$$

wherein $Q_{max}$ denotes the salient subset and $\text{repr}(Q')=\text{yes}$ denotes that for a subset $Q'$ exists a structural compact subgraph in the knowledge graph. If the knowledge graph does not contain a subgraph connecting the entities of the subset $Q'$ thereby satisfying the structural compactness guarantee applies $\text{repr}(Q')=\text{no}$.

According to a preferred embodiment of the method $\text{sal}(v)$, with $\text{sal}(v) \geq 0$, represents a salience for each entity such that the salient subset is computed by maximizing the sum of saliences for each entity of the subset. An implementation for computing the salience is for example described in Ni et al., 2016, Yuan Ni, Qiong Kai Xu, Feng Cao, Yosi Mass, Dafna Sheinwald, Huijia Zhu, and Shao Sheng Cao, "Semantic documents relatedness using concept graph rep-resentation," in WSDM, pages 635-644, 2016, where the entities v and the data set are both represented as TF-IDF weighted word vectors and their cosine similarity is calculated as salience $\text{sal}(v)$.

One option of computing $Q_{max}$ is to decide the representability of each data subset by actually searching for a structural compact subgraph. However, the data set has an exponential number of data subsets, performing that many searches is inefficient. According to a preferred embodiment of the method, the representability of a subset given by $\text{repr}(Q')$ is computed by distance computation. Thereby the expensive process of actually searching for a structural compact subgraph can be avoided.

According to a preferred embodiment of the method of the present invention, the representability of a subset comprises identifying a central vertex of a compact structural subgraph, the central vertex connecting the subset and the compact structural subgraph comprising the central vertex satisfying the structural compactness guarantee.

According to a preferred embodiment of the method of the present invention, for an even diameter the structural compactness guarantee is satisfied if the distance between the central vertex and each entity of the subset satisfies $$\text{dist}(q, c) \leq \left\lceil \frac{D}{2} \right\rceil,$$

wherein c is the central vertex, q is an entity of the subset and D is the diameter bound.

According to a preferred embodiment of the method in, for an odd diameter the structural compactness guarantee is satisfied if the distance between the central vertex and each entity of the subset satisfies $$\text{dist}(q, c) < \left\lceil \frac{D}{2} \right\rceil \text{ or } \text{dist}(q, c) = \left\lceil \frac{D}{2} \right\rceil \text{ and } \text{dist}(q, c') = \left\lceil \frac{D}{2} \right\rceil - 1,$$

wherein c is the central vertex, q is an entity of the subset, D is the diameter bound and c' is a neighbour vertex of the central vertex.

According to a preferred embodiment of the method of the present invention, the step of computing for the salient subset the structural compact subgraph of the knowledge graph comprises merging paths having a common end vertex into an the structural compact subgraph.

Further embodiments of the present invention refer to a system for keyword search in a data set, wherein data of the data set is represented by a knowledge graph, wherein the knowledge graph comprises vertices representing entities of the data set and edges representing relations between said entities, wherein the system is configured to carry out the computer-implemented method according to any of the embodiments.

Further embodiments of the present invention provide a computer program, wherein the computer program comprises computer readable instructions that when executed by a computer, in particular a computer of a system according to the embodiment, cause the computer to execute a method according to any of the embodiments.

Further embodiments of the present invention provide for the use of a method according to the embodiments and/or a system according to the embodiments in knowledge graph based text enrichment where words or phrases in documents such as news articles or reports are annotated with types from a given background knowledge graph, linked to vertices of the knowledge graph. According to the method and/or the system the knowledge graph is used via the search query to help reader of the documents in better understanding of the document. Indeed, a piece of annotated text can be complemented with a subgraph that relates the entities mentioned in the text either directly or indirectly via other vertices and thus show the reader the relation between the entities.

Further advantageous embodiments of the present invention are derived from the following description and the figures.

DETAILED DESCRIPTION OF EXAMPLE EMBODIMENTS

Figure 1:
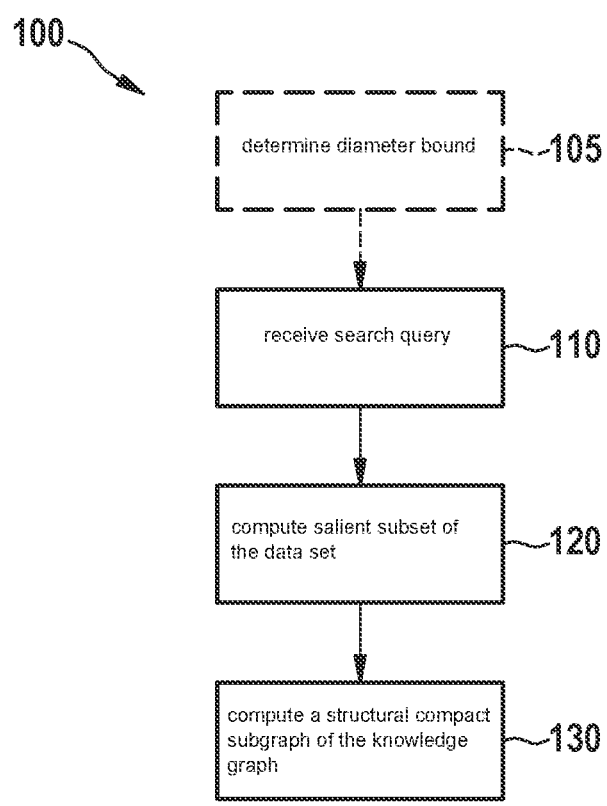
FIG. 1 depicts a schematic view of a computer implemented method for keyword search according to an example embodiment of the present invention.

FIG. 1 refers to a computer implemented method 100 for keyword search in a data set Q, in accordance with an example embodiment of the present invention. Data q of the data Q set is represented by a knowledge graph KG, wherein the knowledge graph KG comprises vertices v representing entities of the data set Q and edges e representing relations between said entities. The data set Q itself is for example a document.

Figure 2:
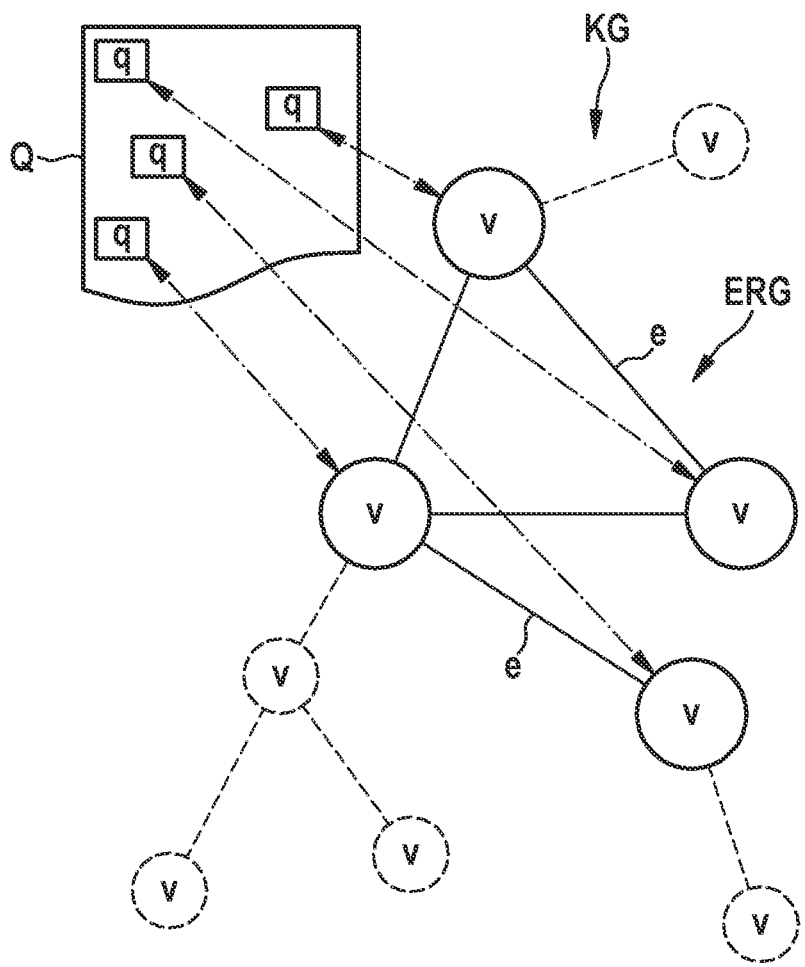
FIG. 2 depicts a schematic view of a knowledge graph according to an example embodiment of the present invention.

An exemplary presentation of a knowledge graph KG is given by FIG. 2. The knowledge graph KG can be used for graph-based knowledge representation by describing entities, for example real world entities, and their relations. The data q of the data set Q is represented in the knowledge graph KG. The knowledge graph can comprise additional information in addition to the data q of the data set Q. The data set Q is for example a text document comprising words or phrases. The documents is for example a news article or report which is annotated with types from a given background knowledge graph, linked to vertices of the knowledge graph.

An important task for knowledge graph KG based applications is to extract subgraphs that are relevant to given sets of vertices v, also referred to as relationship subgraphs, RSGs. For example, a set of vertices v in a knowledge graph KG can be selected during keyword search, where a user queries the knowledge graph KG by posing a set of keywords and the system matches them to vertices of the knowledge graph, relating to entities q of the data set Q, finds relationship subgraphs of the knowledge graph that relate these entities q, and returns them as answers.

According to the example embodiment of the present invention, the method 100 comprises the steps of:
receiving 110 a search query comprising at least two entities;
computing 120 for the at least two entities of the search query a salient subset $Q_{max}$ of the data set Q, wherein the salient subset $Q_{max}$ is computed such that a structural compact subgraph ERG exists in the knowledge graph KG, the structural compact subgraph ERG connecting the at least two entities of the search query,
and computing 130 for the salient subset $Q_{max}$ a structural compact subgraph ERG of the knowledge graph KG which connects the at least two entities of the search query.

Structural compactness can be guaranteed for example by order bounds. According to an embodiment a structural compactness guarantee of a structural compact sub graph ERG is based on a diameter bound D. Preferably, the diameter bound D can be determined prior to executing the step of computing the salient subset and the structural compact subgraph. This is depicted in FIG. 1 by the step 105 determining the diameter bound D.

The step 130 of computing the structural compact subgraph ERG for the salient subset $Q_{max}$ can be performed as described in Cheng et al., 2019, Gong Cheng, Daxin Liu, and Yuzhong Qu, "Fast algorithms for semantic association search and pattern mining," IEEE Trans. Knowl. Data Eng., Early Access:1-13, 2019. The compactness of a subgraph $Q_{max}$ can be measured by its diameter D. For a set of input entities the disclosure presents an algorithm which efficiently searches a knowledge graph KG and finds subgraphs ERG that connect all the input entities and do not exceed a predefined diameter bound D. In brief, the algorithm performs pruned searches starting from each input entity and merges paths having a common end vertex into a subgraph.

According to an embodiment the step 120 of computing the salient subset $Q_{max}$ comprises identifying at least one subset Q' for which a structural compact subgraph ERG exists in the knowledge graph KG denoted by a representability repr(Q')=yes, wherein the salient subset $Q_{max}$ is computed by solving the optimization problem given by $$Qmax = \underset{Q' \subseteq Q \text{ such that } repr(Q')=yes}{\arg\max} \text{ score } (Q'),$$

wherein $$\text{score } (Q') = \sum_{v \in Q} sal(v).$$

According to an embodiment sal(v), with sal(v)≥0, represents a salience for each entity such that the salient subset $Q_{max}$ is computed by maximizing the sum of saliences for each entity of the data subset Q'. An implementation for computing the salience is for example described in Ni et al., 2016, Yuan Ni, Qiong Kai Xu, Feng Cao, Yosi Mass, Dafna Sheinwald, Huijia Zhu, and Shao Sheng Cao, "Semantic documents relatedness using concept graph rep-resentation," in WSDM, pages 635-644, 2016, where the entities v and the data set are both represented as TF-IDF weighted word vectors and their cosine similarity is calculated as salience sal(v).

According to an example embodiment the representability of a subset Q' given by repr(Q') is computed by distance computation. Another option of computing $Q_{max}$ is to decide the representability of each data subset by actually searching for a structural compact subgraph. However, the data set has an exponential number of data subsets, performing that many searches is inefficient. Therefore, by computing the representability by distance computation avoids the expensive process of actually searching for a structural compact subgraph.

According to an example embodiment the representability of a subset Q' comprises identifying a central vertex of a compact structural subgraph ERG, the central vertex connecting the subset Q' and the compact structural subgraph ERG comprising the central vertex satisfying the structural compactness guarantee.

According to an example embodiment for an even diameter the structural compactness guarantee is satisfied if the distance between the central vertex and each entity of the subset (Q') satisfies $$dist(q, c) \leq \left\lceil \frac{D}{2} \right\rceil,$$

wherein c is the central vertex, q is an entity of the subset and D is the diameter bound.

According to an example embodiment for an odd diameter the structural compactness guarantee is satisfied if the distance between the central vertex and each entity of the subset (Q') satisfies $$dist(q, c) < \left\lceil \frac{D}{2} \right\rceil \text{ or } dist(q, c) = \left\lceil \frac{D}{2} \right\rceil \text{ and } dist(q, c') = \left\lceil \frac{D}{2} \right\rceil - 1,$$

wherein c is the central vertex, q is an entity of the subset, D is the diameter bound and c' is a neighbour vertex of the central vertex.

Figure 3:
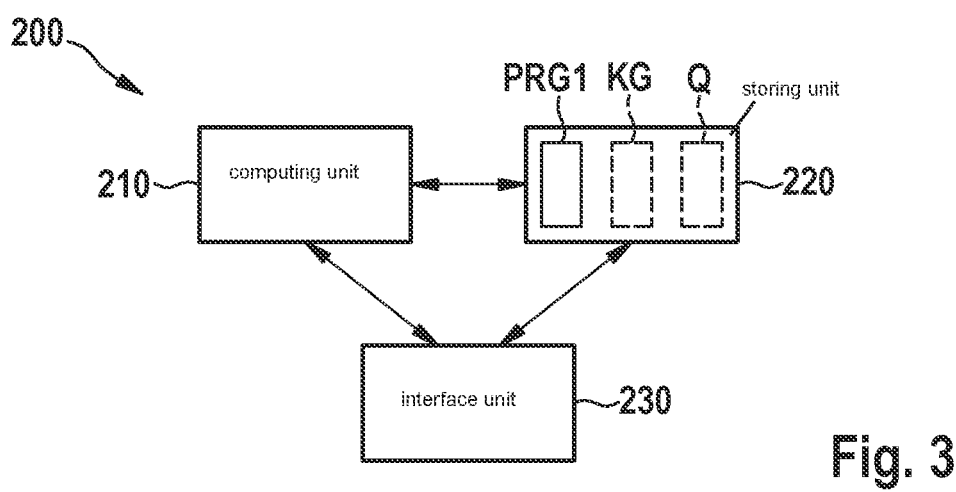
FIG. 3 depicts a schematic view of a system for keyword search according to an example embodiment of the present invention.

FIG. 3 depicts a schematic view of a system 200 for keyword search in a data set according to an embodiment.

The system 200 is configured to carry out at least one of the steps 105, 110, 120 and 130 of the method 100.

The system 200 comprises a computing unit 210, e.g. a microprocessor and/or microcontroller and/or programmable logic device, in particular FPGA, and/or application-specific integrated circuit, ASIC, and/or digital signal processor, DSP, and/or a combination thereof.

The system 200 comprises at least one storing unit 220. The storing unit 220 may further comprise a volatile memory, in particular random access memory (RAM), and/or a non-volatile memory, e.g. a flash EEPROM. The storing unit 220 contains at least one computer program PRG1 for the computing unit 210, which controls the execution of the method 100 for keyword search in a data set.

The system 200 may further comprise an interface unit 230 for receiving data constituting the knowledge graph KG and/or the data set Q and or the search query from at least one external data source. The data constituting the knowledge graph and/or the data set Q and or the search query can be stored in the storing unit 220 of the system or in a further, for example an external, storing unit.

A further example embodiment of the present invention includes a computer program PRG 1. The computer program PRG 1 comprises computer readable instructions that when executed by a computer, in particular the computer 210 of the system 200 according to the embodiments, cause the computer to execute the method 100, in particular steps of the method 100 according to embodiments.

The following lines 1 to 21 of a algorithm 1 depict an exemplary extract of the computer program PRG1 for computation of $Q_{max}$.

The input of algorithm 1 comprises the knowledge graph KG, the data set Q and the diameter bound D.

```
1:    P ← empty priority queue
2:    for all q ∈ Q do
3:        P .insert(<q, q, pr_{q|q}>)
4:        V_q ← {q}
5:    C ← ∅
6:    Q_max ← ∅
7:    while P is not empty do
8:        <c, q, pr_{c|q}> ← P.pull( )
9:        if pr_{c|q} ≤ score(Q_max) then
10:           break the while loop
11:       if c ∉ C then
12:           Q_c ← QMaxCertWith(G, Q, c, D)
13:           C ← C ∪ {c}
14:           if score(Q_c) > score(Q_max) then
15:               Q ← Q_c
16:       if dist(c, q) < ⌊D/2⌋ then
17:           for all c' ∈ NBR(c) do
18:               if c' ∉ V_q then
19:                   P .insert(<c', q, pr_{c'|q}>)
20:                   V_q ← V_q ∪ {c=0 }
21:   return Q_max
```

With reference to algorithm the steps for computing $Q_{max}$ are described by computing which $q \in Q$ to include in $Q_{max}$. So the basic idea is for each q E Q and each entity c that is at most $$\left\lfloor \frac{D}{2} \right\rfloor$$

hops way from q, to find the optimal subset of Q that is certified with c, and to take the optimal subset over all such q and c. Further, rather than brute-force search, best-first search is performed by visiting the most promising c first, and terminating the search process when it is guaranteed that no better subset of Q can be certified with an unvisited entity. The idea is detailed in Algorithm 1.

We run |Q| independent searches starting from distinct input entities in Q. The frontiers of the searches are kept in a shared priority queue P comprising entity-entity-priority triples (lines 1-3). During each search starting from $q \in Q$, a triple $\langle c, q, pr_{c|q} \rangle$ represents a possible certificate c for some subset of Q with priority $pr_{c|q}$.

The best-first search for $Q_{max}$ relies on computation of the priority $pr_{c|q}$. The priority represents an upper bound on the score of subsets of Q that can be certified with c or its descendants in the search starting from q:

$pr_{c|q} = \text{score}(Q_{ub}(c|q))$, where $Q_{ub}(c|q) = \{q\} \cup \{q' \in (Q \setminus \{q\})$:

$\text{dist}(c,q) + \text{dist}(c,q') \leq D\}$.

This heuristic guarantees the optimality of the returned $Q_{max}$. Algorithm 1 solves this task correctly. This can be proved by contradiction. Before the algorithm returns a suboptimal representable subset of Q, it has found the optimal subset by checking entities along a shortest path from some q E Q to c using the subroutine QMaxCertWith.

Each search maintains its own set of visited entities $V_q$ (line 4). An entity c can be visited in different searches, but is checked at most once using the subroutine QMaxCertWith which finds $Q_c$, the optimal subset of Q that is certified with c. The subroutine QMaxCertWith is described in detail later with regard to a algorithm 2.

The set of checked entities is referred to as C (line 5). $Q_{max}$ denotes the optimal representable subset of Q found so far (line 6). Iteratively, the algorithm performs best-first search to check entities that are at moss $$\left\lfloor \frac{D}{2} \right\rfloor$$

hops away mom each $q \in Q$ (lines 7-20). In each iteration, we pull out of P the triple $\langle c, q, pr_{c|q} \rangle$ having the highest priority $pr_{c|q}$ (line 8), which represents an upper bound on the score of subsets of Q that can be certified with c or its descendants in the search starting from q. Therefore, if $pr_{c|q}$ is not better than the current score($Q_{max}$), the algorithm can be terminated and the current $Q_{max}$ is guaranteed to be optimal (lines 9-10). Otherwise, a better subset of Q may be certified with c or its descendant. If c has not been checked in other searches, it will be checked using QMaxCertWith to find $Q_c$ (lines 11-13). If $Q_c$ is better than the current $Q_{max}$, a substitution will be made to update $Q_{max}$ (lines 14-15). The search then continues and will expand the unvisited neighbors of c if they are at most $\lfloor D/2 \rfloor$ hops away from q (lines 16-20).

Algorithm 2 QMaxCertWith

Input: G, Q, c, D; Output: $Q_c$

```
1:    Q_c ← ∅
2:    S ← {q ∈ Q : dist(q, c) ≤ ⌈D/2⌉}
3:    T ← {q ∈ Q : dist(q, c) ≤ ⌈D/2⌉}
4:    if (D is even or T = ∅) and |S| ≥ 2 then
5:        Q_c ← S
6:    else
7:        for all c' ∈ NBR(c) do
8:            V_{c'} ← (S\T) ∪ {q ∈ T : dist(q, c') = ⌈D/2⌉ − 1}
9:            if score(V_{c'}) > score(Q_c) and |V_{c'}| ≥ 2 then
10:               Q_c ← V_{c'}
11:   return Q_c
```

The computation of $Q_{max}$ relies on QMaxCertWith. Algorithm 2 computes $Q_c$, the optimal subset of Q that is certified with c, or returns ∅ if no such subset exists (line 1). A subset S is the subset of Q that) satisfies the compactness guarantee $$dist(q, c) \leq \left\lceil \frac{D}{2} \right\rceil,$$

also referred to a condition 1, line 2. A subset T is the subset of Q that need to be considered for satisfying the compactness guarantee $$dist(q, c) < \left\lceil \frac{D}{2} \right\rceil \text{ or } dist(q, c) = \left\lceil \frac{D}{2} \right\rceil \text{ and } dist(q, c') = \left\lceil \frac{D}{2} \right\rceil - 1,$$

also referred to as condition 2, line 3. When D is even or T is empty, Condition 2 is not triggered, and Condition 1 tells that $Q_c$ is exactly S (lines 4-5). Otherwise, according to Condition 2, entities in T that appear in a subset of Q certified with c should satisfy additional distance constraints about some $c' \in NBR(c)$. Therefore, for each $c' \in NBR(c)$ we find the optimal subset of Q for which $\langle c, c' \rangle$ is a certificate, denoted by $V_{c'}$ (lines 7-8), and we take the optimal subset over all such c' as Qc (lines 9-10).

Further embodiments of the present invention include the use of a method according to the embodiments and/or a system according to the embodiments in knowledge graph based text enrichment where words or phrases in documents such as news articles or reports are annotated with types from a given background knowledge graph, linked to vertices of the knowledge graph. According to the method and/or the system the knowledge graph is used via the search query to help reader of the documents in better understanding of the document. Indeed, a piece of annotated text can be complemented with a subgraph that relates the entities mentioned in the text either directly or indirectly via other vertices and thus show the reader the relation between the entities.

What is claimed is:

1. A computer-implemented method for keyword search in a data set (Q), wherein data of the data set is represented by a knowledge graph, the knowledge graph including vertices (v) representing entities of the data set and edges representing relations between the entities, the method comprising the following steps:
   receiving, by a computer from a user, a search query including at least two entities;
   computing, by the computer, for the at least two entities of the search query a salient subset of the data set, wherein the salient subset is computed such that a structural compact subgraph exists in the knowledge graph, the structural compact subgraph connecting the at least two entities of the search query; and
   computing, by the computer, for the salient subset the structural compact subgraph of the knowledge graph which connects the at least two entities of the search query;
   wherein the step of computing the salient subset ($Q_{max}$) includes identifying, by the computer, at least one subset (Q') for which a structural compact subgraph exists in the knowledge graph denoted by a representability repr(Q')=yes, wherein the salient subset ($Q_{max}$) is computed by solving the optimization problem given by $$Qmax = \underset{Q' \subseteq Q \text{ such that } repr(Q') = yes}{\arg \max} score(Q'),$$

wherein $$score(Q') = \sum_{v \in Q} sal(v),$$

wherein repr(Q')=yes denotes that a structural compact subgraph exists in the knowledge graph for the at least one subset (Q'); and
wherein sal(v) is a computed salience for a vertex (v), representing an entity, of the vertices of the knowledge graph;
wherein words or phrases in a document are annotated with types from the knowledge graph, linked to the vertices of the knowledge graph, and the method further comprises:
   providing, by the computer in response to the query received from the user, the structural compact subgraph to the user, the structural compact subgraph relating entities in the document and showing to the user the relation between the entities.

2. The computer-implemented method according to claim 1, wherein a structural compactness guarantee of the structural compact sub graph is based on a diameter bound.

3. The computer-implemented method according to claim 1, wherein sal(v), with sal(v)≥0, represents a salience for each vertex (v) representing an entity such that the salient subset is computed by maximizing the sum of saliences for each vertex (v) representing an entity of the subset.

4. The computer-implemented method according to claim 3, wherein the representability of the subset (Q') includes identifying a central vertex (c) of a compact structural subgraph, the central vertex connecting the subset and the compact structural subgraph including the central vertex satisfying a structural compactness guarantee.

5. The computer-implemented method according to claim 4, wherein for an even diameter, the structural compactness guarantee is satisfied when a distance between the central vertex (c) and each entity (q) of the subset (Q') satisfies $$dist(q, c) \leq \left\lceil \frac{D}{2} \right\rceil.$$

6. The computer-implemented method according to claim 4, wherein for an odd diameter, the structural compactness guarantee is satisfied when a distance between the central vertex (c) and each entity (q) of the subset (Q') satisfies $$dist(q, c) < \left\lceil \frac{D}{2} \right\rceil \text{ or } dist(q, c) = \left\lceil \frac{D}{2} \right\rceil \text{ and } dist(q, c') = \left\lceil \frac{D}{2} \right\rceil - 1,$$

wherein c' is a neighbour vertex of the central vertex (c).

7. The computer-implemented method according to claim 1, wherein the representability of the subset (Q') given by repr(Q') is computed by distance computation.

8. The computer-implemented method according to claim 1, wherein the step of computing for the salient subset ($Q_{max}$) the structural compact subgraph of the knowledge graph includes merging paths having a common end vertex into the structural compact subgraph.

9. A system for keyword search in a data set, wherein data of the data set is represented by a knowledge graph, the knowledge graph including vertices representing entities of the data set and edges representing relations between the entities, wherein the system includes a computer configured to:
- receive, by the computer from a user, a search query including at least two entities;
- compute, by the computer, for the at least two entities of the search query a salient subset of the data set, wherein the salient subset is computed such that a structural compact subgraph exists in the knowledge graph, the structural compact subgraph connecting the at least two entities of the search query; and
- compute, by the computer, for the salient subset the structural compact subgraph of the knowledge graph which connects the at least two entities of the search query;
- wherein the computing of the salient subset ($Q_{max}$) includes identifying, by the computer, at least one subset (Q') for which a structural compact subgraph exists in the knowledge graph denoted by a representability repr(Q')=yes, wherein the salient subset ($Q_{max}$) is computed by solving the optimization problem given by $$Qmax = \arg\max_{Q' \subseteq Q \text{ such that } repr(Q')=yes} \text{score}(Q'),$$

wherein $$\text{score}(Q') = \sum_{v \in Q} sal(v),$$

- wherein repr(Q')=yes denotes that a structural compact subgraph exists in the knowledge graph for the at least one subset (Q'); and
- wherein sal(v) is a computed salience for a vertex (v), representing an entity, of the vertices of the knowledge graph;
- wherein words or phrases in a document are annotated with types from the knowledge graph, linked to the vertices of the knowledge graph, and the computer is further configured to:
- provide, in response to the query received from the user, the structural compact subgraph to the user, the structural compact subgraph relating entities in the document and showing to the user the relation between the entities.

10. A non-transitory computer-readable storage medium on which is stored a computer program including computer readable instructions for keyword search in a data set, wherein data of the data set is represented by a knowledge graph, the knowledge graph including vertices representing entities of the data set and edges representing relations between the entities, the instructions, when executed by a computer, causing the computer to perform the following steps:
- receiving, by the computer from a user, a search query including at least two entities;
- computing, by the computer from the user, for the at least two entities of the search query a salient subset of the data set, wherein the salient subset is computed such that a structural compact subgraph exists in the knowledge graph, the structural compact subgraph connecting the at least two entities of the search query; and
- computing, by the computer from the user, for the salient subset the structural compact subgraph of the knowledge graph which connects the at least two entities of the search query;
- wherein the step of computing the salient subset ($Q_{max}$) includes identifying, by the computer, at least one subset (Q') for which a structural compact subgraph exists in the knowledge graph denoted by a representability repr(Q')=yes, wherein the salient subset ($Q_{max}$) is computed by solving the optimization problem given by $$Qmax = \arg\max_{Q' \subseteq Q \text{ such that } repr(Q')=yes} \text{score}(Q'),$$

wherein $$\text{score}(Q') = \sum_{v \in Q} sal(v),$$

- wherein repr(Q')=yes denotes that a structural compact subgraph exists in the knowledge graph for the at least one subset (Q'); and
- wherein sal(v) is a computed salience for a vertex (v) representing an entity;
- wherein words or phrases in a document are annotated with types from the knowledge graph, linked to the vertices of the knowledge graph, and wherein the instructions, when executed by the computer, further causes the computer to perform:
- providing, by the computer in response to the query received from the user, the structural compact subgraph to the user, the structural compact subgraph relating entities in the document and showing to the user the relation between the entities.

* * * * *